123,869

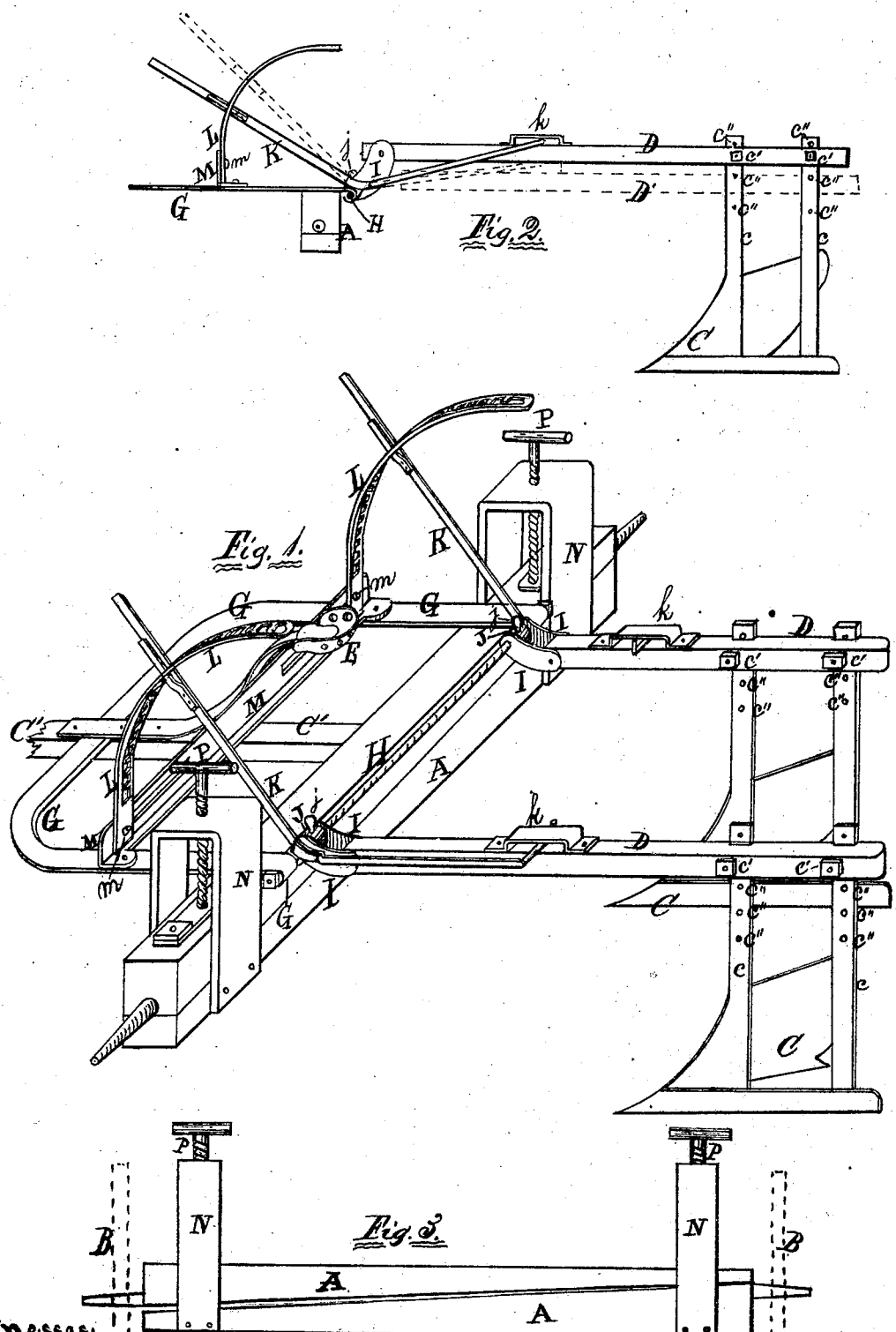

UNITED STATES PATENT OFFICE.

FRANK. G. CHARLES, OF GALESBURG, ILLINOIS.

IMPROVEMENT IN GANG-PLOWS.

Specification forming part of Letters Patent No. 123,869, dated February 20, 1872.

SPECIFICATION.

I, FRANK. G. CHARLES, of Galesburg, in the county of Knox and State of Illinois, have invented certain Improvements in Gang-Plows, of which the following is a specification:

*Nature and Objects of the Invention.*

The nature of my invention relates to improvements in that class of gang-plows known as sulky gang-plows; and it consists in an arrangement of devices for securing the plows to the truck or axle, so as to allow them a free vertical movement and to admit of adjusting their distances apart, all as hereinafter fully described. Second, it consists in an arrangement of devices whereby the operator or driver may, while in his seat above the axle, raise the forward end of either or both plow-beams, or raise the plows and suspend them above the surface of the soil, all as hereinafter fully described. Third, it consists in forming the axle double and devices connected therewith, whereby either end of the axle may be raised or lowered to keep it horizontal when either wheel is running in the furrow.

*Description of the Accompanying Drawing.*

Figure 1 is a perspective view of a machine embodying my invention. Fig. 2 is a side elevation of one of the plow-beams, showing the devices for raising them. Fig. 3 is a rear view of the axle.

*General Description.*

A is the axle; B B, the wheels; and C', the draft-pole; D D, the plow-beams; C C, the plows are attached to the beams D D by standards c c and bolts c' c'. The standards c c are pierced with a series of holes, c'' c'' c'' c'', through which the bolts c' c' pass to secure them to the plow-beams, and by means of which the plows C C may be raised or lowered to change the depth of running. E is the driver's seat. G is a semicircular metal plate resting on the tongue and axle, and its ends projecting in rear of the axle. H is a rod carried in eyes in the ends of the plate G. I I are plates pivoted on the rod H and to the ends of the beams D D. J J are rings or thimbles, one of which is placed between each pair of plates I I and on the rod H, to which they are held by set-screws j j, and act as keepers to hold the plates I I at any desired position on the rod H. By simply loosening the set-screws j j the plates I I may be slid on the rod H, and the distance apart and position of the plow-beams be regulated at pleasure. K K are levers pivoted on the rod H, their rear ends extending back, where they are bent at right angles with the plow-beams, and pass through staples k k on top of said beams, their forward ends engaging with segmental rack-bars L L. M is a slotted plate secured to plate G at right angles with the draft-pole. The lower ends of the rack-bars L L are secured to the plate M by bolts and nuts M M, which may be slid in the slotted plate M to adjust the distance apart and position of the rack-bars L L to suit the position of the beams D D. The axle A is formed in two parts, arranged, as plainly shown in the drawing, the one above the other. The spindles for the wheels B B are attached to the ends of the axle, the one to the upper section and the other to the lower one. The ends of the sections of the axle carrying the wheel-spindles are each larger than its fellow, and the spindles are so set thereon that when both sections of the axle are brought up close together the rod H will be in a horizontal position. N N are arched bars, one at each end of the axle A. The lower ends of the arches N are bolted or otherwise securely attached to the lower section of the axle A. P P are screw-rods passing through threaded holes in the upper and central part of arches N N, their lower ends entering plates on the upper side of the upper section of the axle.

It will be seen that by turning the rods P down into the arches N the sections of the axle at either end may be separated and either side of the truck elevated to hold it in a horizontal position while the wheel on the same side is running in the furrow. By throwing the levers K forward slightly, as shown at Fig. 2 by the dotted lines, the forward ends of the plow-beams may be slightly elevated. By moving the same levers K further forward, as shown by the full lines, the plows may be elevated and held out of and above the ground for transportation or other purposes.

Each plow it will be seen has an independent movement from the other, and the depth of penetration of the soil and lateral position of each relatively to other parts of the machine may be adjusted also independently.

Claims.

1. The beams D, adjustably pivoted to the rod H by plates I and blocks J, in combination with plates G and M, adjustable rack-bars L, levers K, and staples k, substantially as and for the purpose specified.

2. The axle-tree A A, made in two sections and placed one above the other, as shown, the upper one having an axle for one wheel, and the lower one an axle for the opposite wheel, in combination with the arches N N and screws P P, when said arches are both firmly bolted to the lower axle-tree and the screws swiveled to the upper one, as shown and described.

FRANK. G. CHARLES.

Witnesses:
HARVEY P. CHARLES,
G. A. MARSH.